(12) United States Patent
Kim

(10) Patent No.: US 9,537,121 B2
(45) Date of Patent: Jan. 3, 2017

(54) SECONDARY BATTERY AND SECONDARY BATTERY PACK HAVING A FLEXIBLE COLLECTING TAB EXTENDING THROUGH A CAP PLATE

(75) Inventor: Dukjung Kim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 531 days.

(21) Appl. No.: 13/272,621

(22) Filed: Oct. 13, 2011

(65) Prior Publication Data
US 2012/0237817 A1 Sep. 20, 2012

(51) Int. Cl.
| | |
|---|---|
| H01M 2/06 | (2006.01) |
| H01M 2/26 | (2006.01) |
| H01M 2/30 | (2006.01) |
| H01M 2/08 | (2006.01) |
| H01M 2/20 | (2006.01) |
| H01M 2/10 | (2006.01) |
| H01M 2/02 | (2006.01) |
| H01M 2/04 | (2006.01) |
| H01M 10/04 | (2006.01) |
| H01M 10/058 | (2010.01) |

(52) U.S. Cl.
CPC .......... *H01M 2/06* (2013.01); *H01M 2/08* (2013.01); *H01M 2/202* (2013.01); *H01M 2/26* (2013.01); *H01M 2/30* (2013.01); *H01M 2/0232* (2013.01); *H01M 2/0473* (2013.01); *H01M 2/1061* (2013.01); *H01M 2/263* (2013.01); *H01M 10/0431* (2013.01); *H01M 10/058* (2013.01)

(58) Field of Classification Search
None
See application file for complete search history.

(56) References Cited

U.S. PATENT DOCUMENTS

| | | | |
|---|---|---|---|
| 2003/0118903 A1 | 6/2003 | Ogaku | |
| 2005/0158621 A1 | 7/2005 | Benoit et al. | |
| 2006/0024568 A1 | 2/2006 | Lee | |
| 2006/0204841 A1 | 9/2006 | Satoh et al. | |
| 2007/0166605 A1* | 7/2007 | Meguro et al. | 429/61 |

(Continued)

FOREIGN PATENT DOCUMENTS

| | | |
|---|---|---|
| CN | 101834306 A | 9/2010 |
| CN | 101841015 A | 9/2010 |

(Continued)

OTHER PUBLICATIONS

European Search Report in EP 12152205.6-1359/2500964, dated Nov. 26, 2013 (KIM).

*Primary Examiner* — Ula C Ruddock
*Assistant Examiner* — Tony Chuo
(74) *Attorney, Agent, or Firm* — Lee & Morse, P.C.

(57) ABSTRACT

A secondary battery and a secondary battery pack, the secondary battery including a case; an electrode assembly inside the case; a cap plate coupled with the case, the cap plate having an inner side facing an inside of the case and an outer side facing an outside of the case; a flexible collecting tab electrically connected with the electrode assembly and extending through the cap plate from the inner side to the outer side thereof; and, a terminal plate outside of the case and adjacent to the outer side of the cap plate, the flexible collecting tab being electrically connected with the terminal plate.

19 Claims, 9 Drawing Sheets

(56) References Cited

U.S. PATENT DOCUMENTS

| | | |
|---|---|---|
| 2009/0159347 A1 | 6/2009 | Zhou et al. |
| 2009/0162737 A1 | 6/2009 | Lai et al. |
| 2009/0162738 A1 | 6/2009 | Jiang et al. |
| 2009/0162739 A1 | 6/2009 | Han et al. |
| 2009/0162740 A1 | 6/2009 | Li et al. |
| 2009/0162741 A1 | 6/2009 | Zheng et al. |
| 2009/0162744 A1 | 6/2009 | Zheng et al. |
| 2009/0162747 A1 | 6/2009 | Zhu et al. |
| 2010/0098973 A1 | 4/2010 | Lee et al. |
| 2010/0173178 A1 | 7/2010 | Kim et al. |
| 2010/0178547 A1* | 7/2010 | Li .................. H01M 2/0245 429/151 |
| 2010/0224671 A1 | 9/2010 | Scheuerman et al. |
| 2010/0233528 A1 | 9/2010 | Kim et al. |
| 2010/0233529 A1 | 9/2010 | Nansaka et al. |
| 2010/0279156 A1 | 11/2010 | Kim et al. |
| 2011/0123868 A1* | 5/2011 | Kawaoka et al. ............ 429/304 |
| 2011/0195296 A1* | 8/2011 | Kim et al. .................... 429/151 |
| 2012/0214030 A1* | 8/2012 | Guen .................. H01M 2/0404 429/61 |
| 2014/0363731 A1 | 12/2014 | Tanaka et al. |

FOREIGN PATENT DOCUMENTS

| | | |
|---|---|---|
| JP | 2006/040899 A | 2/2006 |
| JP | 2012/049076 A | 3/2012 |
| KR | 2001-0048098 A | 6/2001 |
| KR | 10-2003-0057349 A | 7/2003 |
| KR | 2003-0057349 A | 7/2003 |
| KR | 10-2006-0118956 | 11/2006 |
| KR | 10-2008-0047982 A | 5/2008 |
| KR | 10-2010-0081508 A | 7/2010 |
| KR | 10-2010-0098540 A | 9/2010 |
| KR | 10-2010-0099652 A | 9/2010 |
| KR | 10-2010-0102040 A | 9/2010 |
| KR | 10-2010-0102462 A | 9/2010 |
| KR | 10-2010-0110666 A | 10/2010 |
| WO | WO 2010/064288 A1 * | 6/2010 ............ H01M 10/40 |

\* cited by examiner

SECONDARY BATTERY AND SECONDARY BATTERY PACK HAVING A FLEXIBLE COLLECTING TAB EXTENDING THROUGH A CAP PLATE

CROSS-REFERENCE TO RELATED APPLICATION

The present application claims priority under 35 U.S.C. §119(e) to U.S. Provisional Application No. 61/454,338, filed on Mar. 18, 2011, and entitled: "Secondary Battery," which is incorporated herein by reference in its entirety.

BACKGROUND

1. Field

Embodiments relate to a secondary battery and a secondary battery pack.

2. Description of the Related Art

Secondary batteries are rechargeable, unlike primary batteries. Secondary batteries may include, e.g., a low capacity battery including a battery cell in the form of a pack may be used for small portable electronic devices such as cellular phones and camcorders. A high capacity battery (including dozens of battery cells connected to one another) may be used as a motor-driving power source for electric scooters, hybrid vehicles, or electric vehicles.

SUMMARY

Embodiments are directed to a secondary battery and a secondary battery pack.

The embodiments may be realized by providing a secondary battery including a case; an electrode assembly inside the case; a cap plate coupled with the case, the cap plate having an inner side facing an inside of the case and an outer side facing an outside of the case; a flexible collecting tab electrically connected with the electrode assembly and extending through the cap plate from the inner side to the outer side thereof; and a terminal plate outside of the case and adjacent to the outer side of the cap plate, the flexible collecting tab being electrically connected with the terminal plate.

The flexible collecting tab may include an electrode connection portion electrically connected with a non-coating portion of the electrode assembly, and a terminal connection portion electrically connected with the terminal plate.

The terminal plate may include a terminal plate tab through hole therethrough, the terminal connection portion of the flexible collecting tab passing through the terminal plate tab through hole.

The terminal connection portion of the flexible collecting tab may include a first bent portion, the first bent portion being coupled with a tab receiving recess on an upper surface of the terminal plate.

The terminal plate may include a bus bar receiving recess on the upper surface thereof, the bus bar receiving recess being disposed opposite to the tab receiving recess relative to the tab through hole.

The terminal plate and the flexible collecting tab may be formed of a same material.

The secondary battery may further include an upper insulator between the terminal plate and the cap plate, the upper insulator electrically insulating the terminal plate from the cap plate.

The upper insulator may include an upper insulator tab through hole and an upper insulator flange, the flexible collecting tab passing through the upper insulator tab through hole, and the terminal plate being supported by the upper insulator flange.

The terminal plate may include a terminal plate protrusion on a lower surface thereof, the upper insulator may include an upper insulator protrusion on a lower surface thereof, the upper insulator protrusion including an upper insulator protrusion through hole therethrough, the cap plate may include a cap plate protrusion through hole therethrough, the terminal plate protrusion may pass through the upper insulator protrusion through hole, and the terminal plate protrusion and the upper insulator protrusion may pass through the cap plate protrusion through hole.

The secondary battery may further include a lower insulator under the cap plate, the lower insulator electrically insulating the electrode assembly from the cap plate, and a seal gasket under the cap plate and coupled with the lower insulator.

The lower insulator may include an electrode assembly recess and a lower insulator flange, the electrode assembly recess being coupled with the electrode assembly and having a shape corresponding to a rounded edge of the electrode assembly, and the lower insulator flange being coupled with the inner side of the cap plate.

The seal gasket may include an upper extension extending upwardly from a top surface thereof, a lower extension extending downwardly from a bottom surface thereof, and a seal gasket tab through hole passing through the upper extension and the lower extension, the flexible collecting tab passing through the seal gasket tab through hole.

The secondary battery may further include a reinforcement under the seal gasket.

The reinforcement may include a tab groove, the flexible collecting tab passing through the tab groove.

The secondary battery may further include an upper insulator between the terminal plate and the cap plate, the upper insulator electrically insulating the terminal plate from the cap plate, a lower insulator under the cap plate, the lower insulator electrically insulating the electrode assembly from the cap plate; a seal gasket under the cap plate and coupled with the lower insulator, and a reinforcement under the seal gasket.

The terminal plate may include a terminal plate protrusion on a lower surface thereof, the upper insulator may include an upper insulator protrusion on a lower surface thereof, the upper insulator protrusion including an upper insulator protrusion through hole therethrough, the cap plate may include a cap plate protrusion through hole therethrough, the seal gasket may include a seal gasket protrusion through hole therethrough, the reinforcement may include a reinforcement protrusion through hole therethrough, the terminal plate protrusion may pass through the upper insulator protrusion through hole, and the terminal plate protrusion and the upper insulator protrusion may pass through the cap plate protrusion through hole, the seal gasket protrusion through hole, and the reinforcement protrusion through hole.

The flexible collecting tab may have a thickness of about 0.1 μm to about 1,000 μm.

The flexible collecting tab may be a single, monolithically formed collecting tab.

The embodiments may also be realized by providing a secondary battery pack including a plurality of secondary batteries, each secondary battery including a case; an electrode assembly inside the case; a cap plate coupled with the case, the cap plate having an inner side facing an inside of the case and an outer side facing an outside of the case; and a flexible collecting tab electrically connected with the electrode assembly and extending through the cap plate from the inner side to the outer side thereof, and a terminal, the terminal including a terminal plate, wherein the terminal plate is outside of the case and adjacent to the outer side of the cap plate and the flexible collecting tab is electrically connected with the terminal plate, and wherein the terminal of one of the secondary batteries is electrically connected to the terminal of an adjacent secondary battery with a bus bar.

The flexible collecting tab may include an electrode connection portion electrically connected with a non-coating portion of the electrode assembly and a terminal connection portion electrically connected with the terminal plate, the terminal connection portion of the flexible collecting tab may include a first bent portion, the first bent portion being coupled with a tab receiving recess on an upper surface of the terminal plate, the terminal plate may include a bus bar receiving recess on the upper surface thereof, the bus bar receiving recess being disposed opposite to the tab receiving recess relative to a terminal plate tab through hole, and the bus bar connecting adjacent secondary batteries may be coupled to the bus bar receiving recess of the respective secondary batteries.

BRIEF DESCRIPTION OF THE DRAWINGS

The embodiments will become apparent to those of ordinary skill in the art by describing in detail exemplary embodiments with reference to the attached drawings, in which:

FIG. 1b illustrates a cross-sectional view taken along line I-I' of FIG. 1a.

FIGS. 3a and 3b illustrate exploded perspective views of a part of the secondary battery of FIG. 1a.

FIG. 4a illustrates a perspective view of a part of the secondary battery of FIG. 1a.

FIG. 4b illustrates a front view illustrating the part of FIG. 4a.

FIG. 4c illustrates a side view of the part of FIG. 4a.

DETAILED DESCRIPTION

Figure 1A:
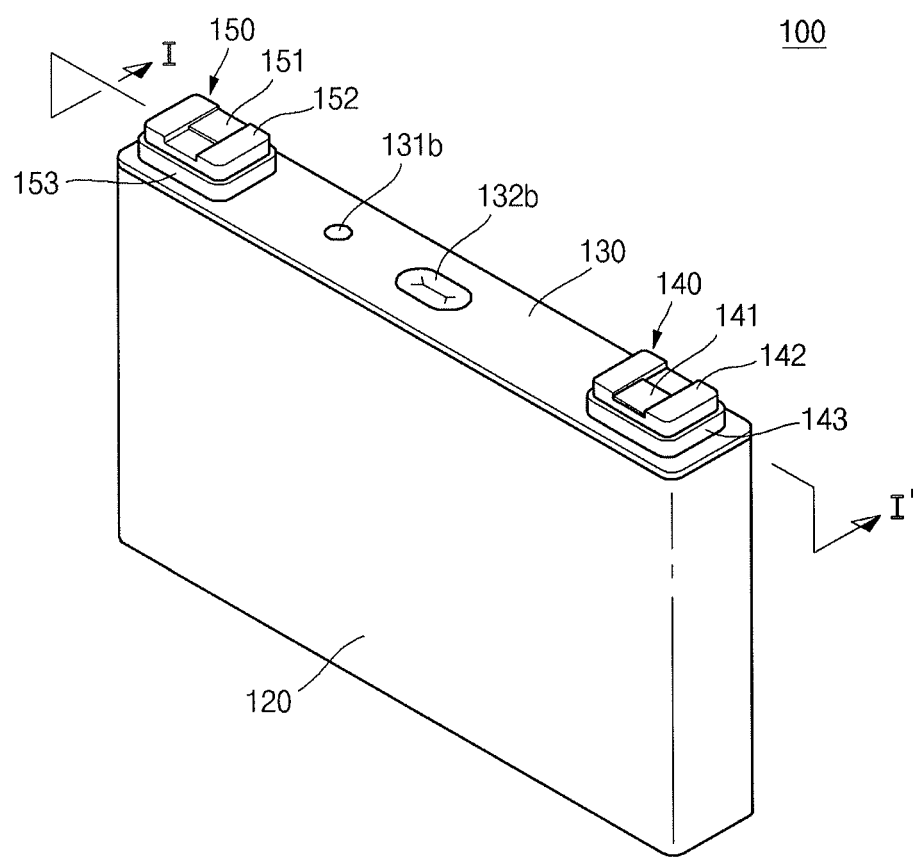
FIG. 1a illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Hereinafter, embodiments will be described in detail with reference to the accompanying drawings.

Figure 1B:
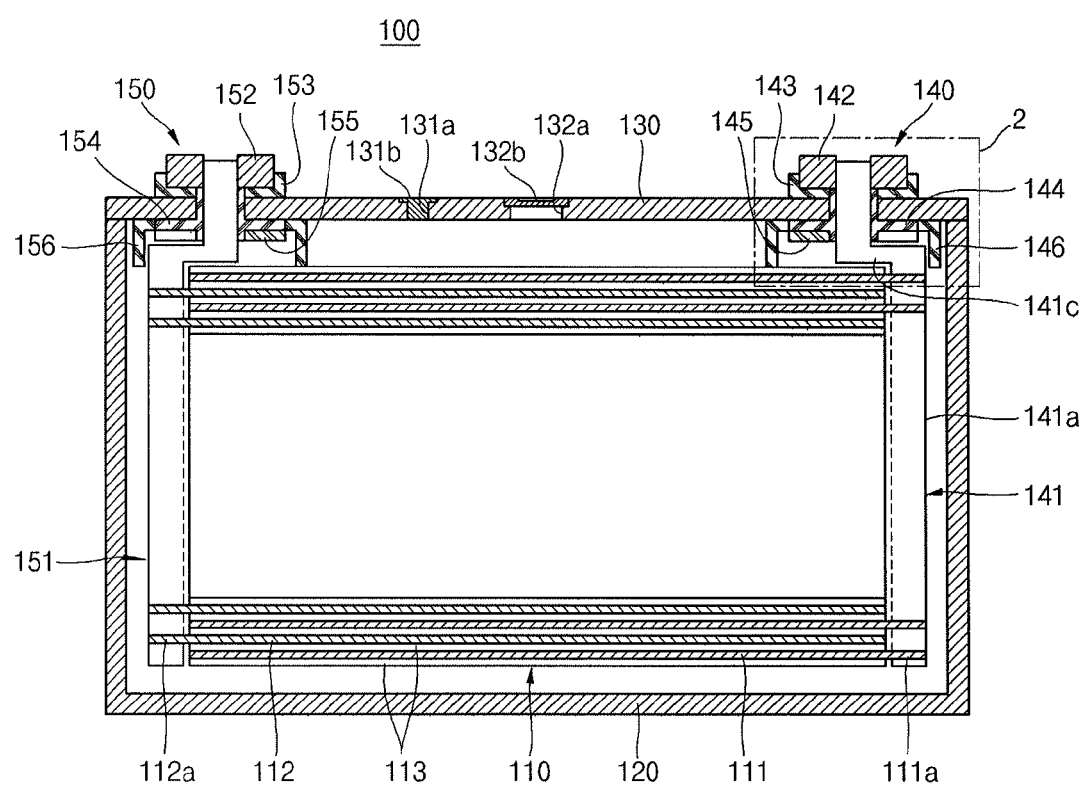
Figure 2:
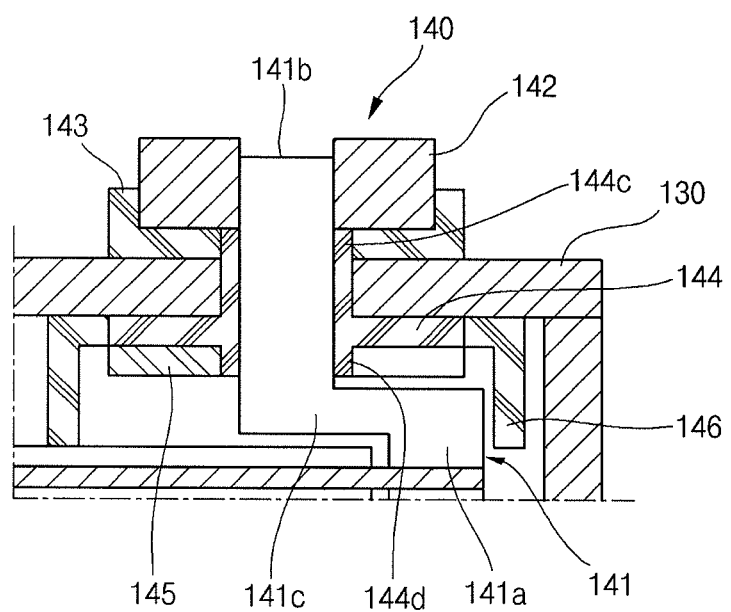
FIG. 2 illustrates an enlarged view of a region 2 of FIG. 1b.

FIG. 1a illustrates a perspective view of a secondary battery according to an embodiment. FIG. 1b illustrates a cross-sectional view taken along line I-I' of FIG. 1a. FIG. 2 illustrates an enlarged view of a region 2 of FIG. 1b.

Referring to FIGS. 1a and 1b, a secondary battery 100 according to an embodiment may include an electrode assembly 110, a case 120, a cap plate 130, a first terminal part 140, and a second terminal part 150.

The electrode assembly 110 may be formed by winding or stacking a first electrode plate 111, a separator 113, and a second electrode plate 112 (which may have a thin plate or film shape). The first electrode plate 111 may function as a positive electrode or a negative electrode; and the second electrode plate 112 may have a polarity opposite to that of the first electrode plate 111.

The first electrode plate 111 may be formed by applying a first electrode active material (e.g., a transition metal oxide) on a first electrode collector formed of metal foil (e.g., aluminum foil). The first electrode plate 111 may include a first electrode non-coating portion 111a on which the first electrode active metal is not applied. The first electrode non-coating portion 111a may function as a passage for current flowing between the first electrode plate 111 and an outside of the first electrode plate 111. The material of the first electrode plate 111 is not limited to the described embodiments.

The second electrode plate 112 may be formed by applying a second electrode active material (e.g., graphite or carbon) on a second electrode collector formed of metal foil (e.g., nickel or copper foil). The second electrode plate 112 may include a second electrode non-coating portion 112a on which the second electrode active metal is not applied. The second electrode non-coating portion 112a may function as a passage for current flowing between the second electrode plate 112 and an outside of the second electrode plate 112. The material of the second electrode plate 112 is not limited to the described embodiments.

The first and second electrode plates 111 and 112 may change or reverse polarity with each other.

The separator 113 may be disposed between the first electrode plate 111 and the second electrode plate 112 to prevent a short circuit and to facilitate movement of lithium ions. The separator 113 may be formed of polyethylene, polypropylene, or a combined film of polypropylene and polyethylene. The material of the separator 113 is not limited to the described embodiments.

Ends of the electrode assembly 110 may be respectively coupled with the first and second terminal parts 140 and 150, which may be electrically connected to the first and second electrode plates 111 and 112, respectively.

The electrode assembly 110 and electrolyte may be disposed in the case 120. The electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiPF_6$ or $LiBF_4$. The electrolyte may be liquid, solid, or gel.

The case 120 may be formed of a conductive metal, e.g., aluminum, aluminum alloy, or steel plated with nickel. The case 120 may have an approximately hexahedral shape with an upper opening through which the electrode assembly 110 and portions of the first and second terminal parts 140 and 150 may be inserted and placed. Referring to FIG. 1b, the cap plate 130 may be coupled with an upper portion of the case 120 to seal the case 120. An inner surface of the case 120 may be treated to be electrically insulated from the electrode assembly 110 and portions of the first and second terminal parts 140 and 150 within the case 120. Alternatively, an insulating bag (not shown) accommodating the electrode assembly 110 and the portions of the first and second terminal parts 140 and 150 may be disposed in the case 120.

The cap plate 130 may be coupled with the upper opening of the case 120, e.g., by a laser welding process. The cap plate 130 may be formed of the same material as that of the case 120. When the cap plate 130 is electrically connected to the first terminal part 140, the cap plate 130 and the first terminal part 140 may have the same polarity. Accordingly, the case 120 and the cap plate 130 may have the same polarity. The cap plate 130 may include an injection hole 131a (for supplying the electrolyte) and a plug 131b coupled with the injection hole 131a. The cap plate 130 may include a vent hole 132a and a thin safety vent 132b coupled with the vent hole 132a. The vent hole 132a may facilitate discharging of gas when an inner pressure of the case 120 exceeds a predetermined pressure. Further, the cap plate 130 may include a cap plate tab through hole 131 and a cap plate protrusion through hole 132, which will be described below.

The first terminal part 140 may include a flexible collecting tab 141, a terminal plate 142, an upper insulator 143, a seal gasket 144, a reinforcement 145, and a lower insulator 146.

The flexible collecting tab 141 may include a first region 141a or electrode connection portion (inside the case 120 and electrically connected to the electrode assembly 110) and a second region 141b or terminal connection portion (outside the case 120 and electrically connected to the terminal plate 142). For example, the first region 141a may be welded to the first electrode non-coating portion 111a of the first electrode plate 111. The second region 141b may pass through the cap plate 130 and the terminal plate 142, and then, may be welded to the terminal plate 142.

The flexible collecting tab 141 and the first electrode non-coating portion 111a may be formed of the same material. For example, when the first electrode non-coating portion 111a is formed of aluminum or an aluminum alloy, the flexible collecting tab 141 may also be formed of aluminum or an aluminum alloy. Alternatively, when the first electrode non-coating portion 111a is formed of copper, a copper alloy, nickel, or a nickel alloy, the flexible collecting tab 141 may also be formed of copper, a copper alloy, nickel, or a nickel alloy. When the flexible collecting tab 141 and the first electrode non-coating portion 111a are formed of the same material, the flexible collecting tab 141 may be efficiently welded to the first electrode non-coating portion 111a.

The flexible collecting tab 141 may have a thickness of about 0.1 μm about 1,000 μm, e.g., for facilitating bending. Maintaining the thickness of the flexible collecting tab 141 at about 0.1 μm or greater may help prevent melting of the flexible collecting tab 141 during a welding process and may help ensure efficient welding to the first electrode non-coating portion 111a or the terminal plate 142. Maintaining the thickness of the flexible collecting tab 141 at about 1000 μm or less may help ensure that the flexible collecting tab 141 is not resistant to bending, e.g., bending of the flexible collecting tab 141 at the upper side of the terminal plate 142 may be facilitated. Thus, welding of the flexible collecting tab 141 to the terminal plate 142 may be facilitated. In addition, designing of the flexible collecting tab 141 in the case 120 may not be limited.

Even when the thickness of the flexible collecting tab 141 less than about 0.1 μm. An or greater than about 1000 μm, the flexibility of the flexible collecting tab 141 may be controlled by adjusting a composition ratio of the flexible collecting tab 141. For example, even when the thickness of the flexible collecting tab 141 is greater than about 1000 μm, the flexible collecting tab 141 may be efficiently bent by adding a material having low hardness, e.g., Sn, Ag, Au, Zn, Bi, SnAg, SnAu, SnZn, SnZnBi, or SnAgBi, to aluminum, an aluminum alloy, copper, a copper alloy, nickel, or a nickel alloy. This method may also be used when the thickness of the flexible collecting tab 141 is about 0.1 μm to about 1000 μm.

The terminal plate 142 may be disposed outside the case 120. For example, the terminal plate 142 may be installed on the cap plate 130. The terminal plate 142 and the flexible collecting tab 141 may be formed of the same material. For example, when the flexible collecting tab 141 is formed of aluminum or an aluminum alloy, the terminal plate 142 may also be formed of aluminum or an aluminum alloy. Thus, when the flexible collecting tab 141 and the terminal plate 142 may be formed of the same material, the flexible collecting tab 141 may be efficiently welded to the terminal plate 142.

In an implementation, a plurality of the secondary batteries 100 may be provided. The plurality of secondary batteries 100 may be electrically connected to each other with a bus bar formed of, e.g., aluminum. In this case, the terminal plate 142 may also be formed of aluminum and the bus bar may be efficiently welded to the terminal plate 142.

The upper insulator 143 may be disposed outside the case 120. For example, the upper insulator 143 may be installed on the cap plate 130. The upper insulator 143 may be disposed between the cap plate 130 and the terminal plate 142 to electrically insulate the cap plate 130 and the terminal plate 142 from each other.

The seal gasket 144 may be disposed between the flexible collecting tab 141 and the cap plate 130. For example, the seal gasket 144 may surround the flexible collecting tab 141 and may be coupled with the cap plate 130 so that the flexible collecting tab 141 is electrically insulated from the cap plate 130.

The reinforcement 145 may be coupled with a lower portion of the seal gasket 144. The reinforcement 145 may include a metal plate or may be formed of engineering plastic. For example, the terminal plate 142 may be coupled with and fixed to the reinforcement 145, which will be described below.

The lower insulator 146 may be coupled with an edge of the seal gasket 144 and may be disposed between the electrode assembly 110 and the cap plate 130. The lower insulator 146 may help reduce or prevent vertical shaking of the electrode assembly 110, which will be described below.

According to the embodiment, the flexible collecting tab 141 and the terminal plate 142 may be electrically connected to each other without a separate member (e.g., a collecting terminal), thereby reducing a length of a current path and, in turn, reducing electric resistance. In addition, according to the embodiment, the flexible collecting tab 141 may function as a collecting member for connecting the electrode assembly 110 to the terminal plate 142. Thus, the flexible collecting tab 141 may be freely bent. Accordingly, a space taken or occupied by the flexible collecting tab 141 in the case 120 may be minimized; and a size of the electrode assembly 110 accommodated in the case 120 may be increased. In addition, instead of a rigid collecting tab (resistant to bending), the flexible collecting tab 141 (that is susceptible to bending) may be used, thereby reducing the likelihood of or preventing external shock from damaging the electrode assembly 110 through the flexible collecting tab 141.

The second terminal part 150 may include a flexible collecting tab 151, a terminal plate 152, an upper insulator 153, a seal gasket 154, a reinforcement 155, and a lower insulator 156. The second terminal part 150 may be the same in shape and structure as the first terminal part 140, and a repeated description thereof is omitted.

Figure 3A:
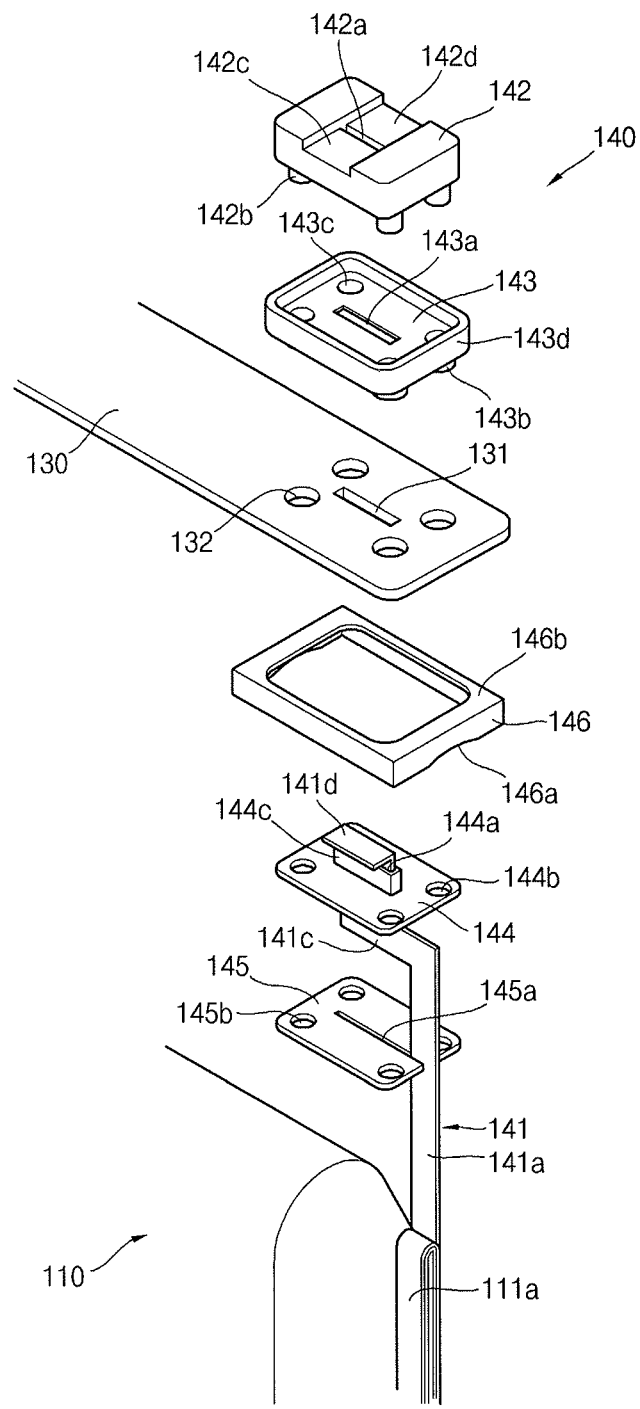
Figure 3B:
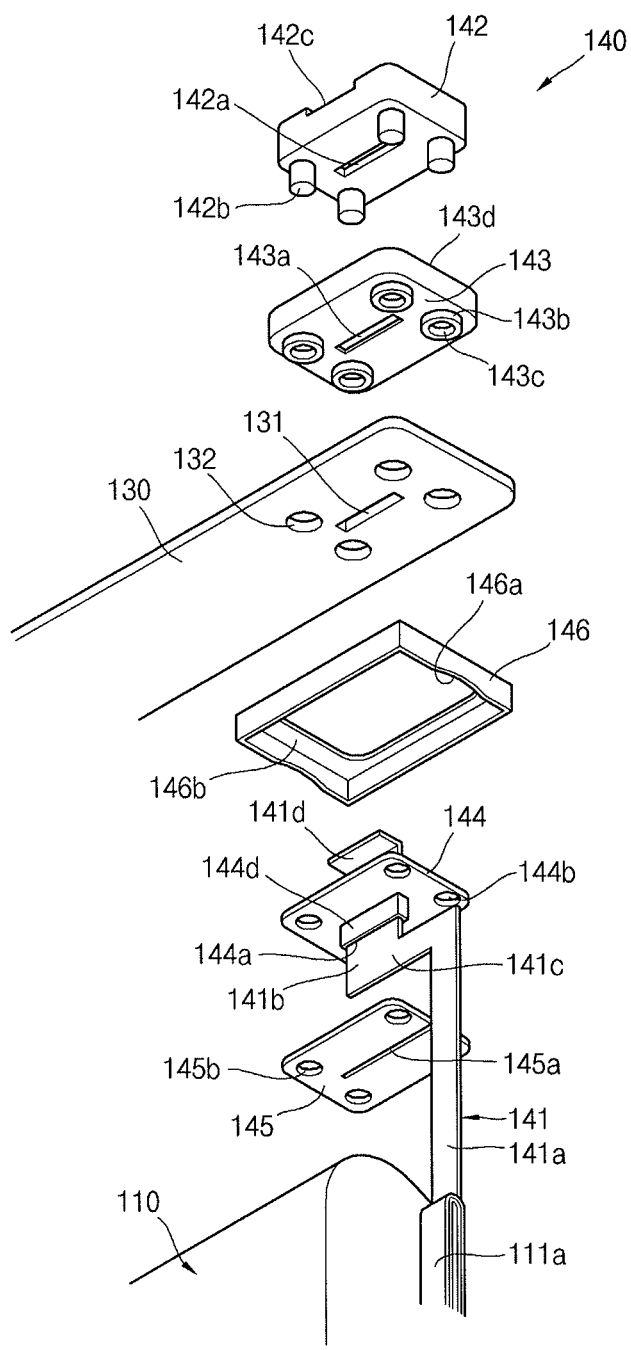

FIGS. 3a and 3b illustrate exploded perspective views of a part of a secondary battery according to an embodiment.

Referring to FIGS. 3a and 3b, a structure for coupling the terminal plate 142, the upper insulator 143, the cap plate 130, the seal gasket 144, the reinforcement 145, the lower insulator 146, and the flexible collecting tab 141 to one another will be described.

The terminal plate 142 may include a terminal plate tab through hole 142a (through which the flexible collecting tab 141 may pass) and terminal plate protrusions 142b in a lower surface thereof. The terminal plate protrusions 142b may be coupled with the cap plate 130 through the upper insulator 143. Furthermore, the terminal plate protrusions 142b may be coupled with the seal gasket 144 and the reinforcement 145. Thus, the terminal plate 142 may be stably fixed to the cap plate 130. The terminal plate 142 may include a tab receiving recess 142c in an upper surface thereof. The tab receiving recess 142c may have an approximately tetragonal shape. The flexible collecting tab 141 may be placed on the tab receiving recess 142c and may be welded thereto. For example, the flexible collecting tab 141 may pass through the terminal plate tab through hole 142a of the terminal plate 142 (from a lower side thereof to an upper side thereof) and may then be bent and placed in the tab receiving recess 142c. After that, the flexible collecting tab 141 may be welded to the tab receiving recess 142c. When the flexible collecting tab 141 and the terminal plate 142 are formed of the same material, the welding thereof may be facilitated. For example, when the flexible collecting tab 141 and the terminal plate 142 are formed of aluminum or an aluminum alloy, the welding thereof may be facilitated.

However, if the flexible collecting tab 151 and the terminal plate 152 are formed of different materials, the welding thereof may be difficult. For example, if the flexible collecting tab 151 is formed of copper, a copper alloy, nickel, or a nickel alloy, and the terminal plate 152 is formed of aluminum or an aluminum alloy, the welding thereof may be difficult. In this case, a copper plated layer having a predetermined thickness may be formed in advance on a tab receiving recess (not shown) of the terminal plate 152. The copper plated layer may be formed using, e.g., electroless plating or electroplating. Accordingly, after the flexible collecting tab 151 (formed of copper) passes through the terminal plate 152, the flexible collecting tab 151 may be placed on the copper plated layer formed on the tab receiving recess (not shown) of the terminal plate 152. Then, the flexible collecting tab 151 may be welded to the copper plated layer with a welding tool. Thus, the flexible collecting tab 151 and the terminal plate 152 (formed of different materials) may be electrically connected to each other. For example, this structure may be adapted for a negative terminal.

A bus bar receiving recess 142d (which may have an approximately tetragonal shape corresponding to the tab receiving recess 142c) may be disposed in the upper surface of the terminal plate 142. The bus bar (described below) may be placed in the bus bar receiving recess 142d and may be welded thereto. The bus bar may be positioned by the bus bar receiving recess 142d. In an implementation, the bus bar receiving recess 142d may be omitted.

The upper insulator 143 may be disposed under the terminal plate 142. For example, the upper insulator 143 may be disposed between the terminal plate 142 and the cap plate 130. The upper insulator 143 may include an upper insulator tab through hole 143a through which the flexible collecting tab 141 may pass. The upper insulator tab through hole 143a of the upper insulator 143 may be aligned with the terminal plate tab through hole 142a of the terminal plate 142. Upper insulator protrusions 143b may be disposed on a lower surface of the upper insulator 143. Upper insulator protrusion through holes 143c may be disposed in respective upper insulator protrusions 143b. The upper insulator protrusion through holes 143c may be aligned with the terminal plate protrusions 142b of the terminal plate 142. The upper insulator protrusions 143b of the upper insulator 143 may be coupled with the cap plate 130, the seal gasket 144, and the reinforcement 145. The upper insulator 143 may include an upper insulator flange 143d that surrounds the terminal plate 142 to safely insulate the terminal plate 142 from the cap plate 130.

The cap plate 130 may be disposed under the upper insulator 143. The cap plate 130 may include the cap plate tab through hole 131 (through which the flexible collecting tab 141 may pass) and cap plate protrusion through holes 132 (through which the upper insulator protrusions 143b of the upper insulator 143 may pass). The cap plate tab through hole 131 of the cap plate 130 may be aligned with the upper insulator tab through hole 143a of the upper insulator 143 and the terminal plate tab through hole 142a of the terminal plate 142. The cap plate protrusion through holes 132 of the cap plate 130 may be aligned with the upper insulator protrusions 143b of the upper insulator 143 and the terminal plate protrusions 142b of the terminal plate 142.

The seal gasket 144 may be disposed under the cap plate 130. The seal gasket 144 may include a seal gasket tab through hole 144a (through which the flexible collecting tab 141 may pass) and seal gasket protrusion through holes 144b (through which the upper insulator protrusions 143b of the upper insulator 143 may pass). The seal gasket tab through hole 144a of the seal gasket 144 may be aligned with the upper insulator tab through hole 143a of the upper insulator 143 and the terminal plate tab through hole 142a of the terminal plate 142. The seal gasket protrusion through holes 144b of the seal gasket 144 may be aligned with the upper insulator protrusions 143b of the upper insulator 143 and the terminal plate protrusions 142b of the terminal plate 142. Thus, the upper insulator protrusions 143b of the upper insulator 143 and the terminal plate protrusions 142b of the terminal plate 142 may be coupled with the seal gasket protrusion through holes 144b of the seal gasket 144. The seal gasket 144 may include an upper extension 144c extending upwardly from the seal gasket tab through hole 144a to insulate the flexible collecting tab 141 from the cap plate 130. For example, the upper extension 144c may be coupled with the cap plate tab through hole 131 of the cap plate 130. Further, the seal gasket 144 may include a lower extension 144d extending downwardly from the seal gasket tab through hole 144a to surround the flexible collecting tab 141.

The seal gasket 144 may be formed using insert injection molding. For example, the flexible collecting tab 141 may be disposed in a mold (not shown); and insulating resin may be injected in the mold to surround a portion of the flexible collecting tab 141, thereby forming the seal gasket 144 that surrounds the flexible collecting tab 141 and includes the seal gasket protrusion through holes 144b around the flexible collecting tab 141. The insert injection molding makes it possible to more reliably prevent leakage of the electrolyte through the interface between the flexible collecting tab 141 and the seal gasket 144.

The reinforcement 145 may be disposed under the seal gasket 144. The reinforcement 145 may include a tab groove 145a (through which the flexible collecting tab 141 may pass) and reinforcement protrusion through holes 145b (through which the terminal plate protrusions 142b of the terminal plate 142 and the upper insulator protrusions 143b of the upper insulator 143 may pass and be coupled thereto). Lower ends of the terminal plate protrusions 142b of the terminal plate 142 may be coupled using, e.g., riveting, to the reinforcement protrusion through holes 145b of the reinforcement 145. The reinforcement 145 may be formed of a high strength material to intensively fix the terminal plate 142. For example, the terminal plate 142 may be formed of a metal or engineering plastic. However, the material of the terminal plate 142 is not limited thereto.

The lower insulator 146 (disposed under the cap plate 130) may surround the seal gasket 144 and the reinforcement 145. The lower insulator 146 may have an upper opening and a lower opening and may include electrode assembly recesses 146a in a lower surface thereof at both sides facing each other. The electrode assembly recesses 146a may be recessed upwardly. For example, the electrode assembly recesses 146a may have a shape corresponding to an upper round or rounded edge of the electrode assembly 110 and may closely contact the upper round. The lower insulator 146 may include a lower insulator flange 146b that closely contacts the cap plate 130.

The flexible collecting tab 141 may include two bent portions. For example, the flexible collecting tab 141 may include a second bent portion 141c (disposed under the cap plate 130) and a first bent portion 141d (disposed over the cap plate 130). The second bent portion 141c may be bent two-dimensionally. In an implementation, the second bent portion 141c may be omitted. For example, the first and second regions 141a and 141b of the flexible collecting tab 141 may have straight line shapes. The term 'two-dimensionally' may refer to the second bent portion 141c after the bending and the second bent portion 141c before the bending being disposed on the same plane. The first bent portion 141d may be formed by three-dimensionally bending the flexible collecting tab 141 passing through the terminal plate tab through hole 142a of the terminal plate 142. The term 'three-dimensionally' may refer to the first bent portion 141d after the bending and the first bent portion 141c before the bending being disposed on different planes. In an implementation, the flexible collecting tab 141 may be bent in various other shapes. For example, the first region 141a of the flexible collecting tab 141 in the case 120 may be bent three-dimensionally in various shapes.

Accordingly, the secondary battery 100 may include the flexible collecting tab 141; and the terminal plate 142 may be securely fixed to the cap plate 130. For example, the terminal plate protrusions 142b of the terminal plate 142 may pass through the upper insulator 143 and the seal gasket 144 and may be fixed to the reinforcement 145. Thus, the terminal plate 142 may be securely fixed to the cap plate 130.

Figure 4A:
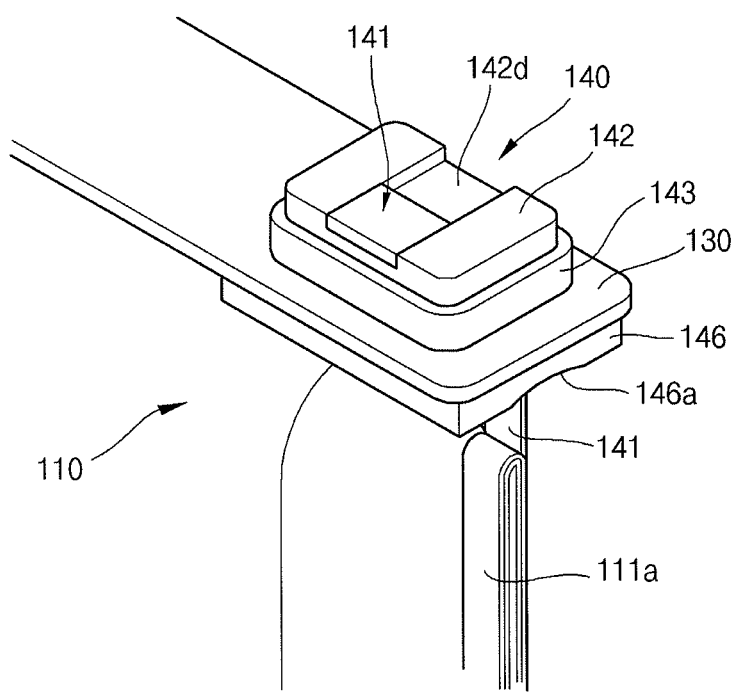
Figure 4B:
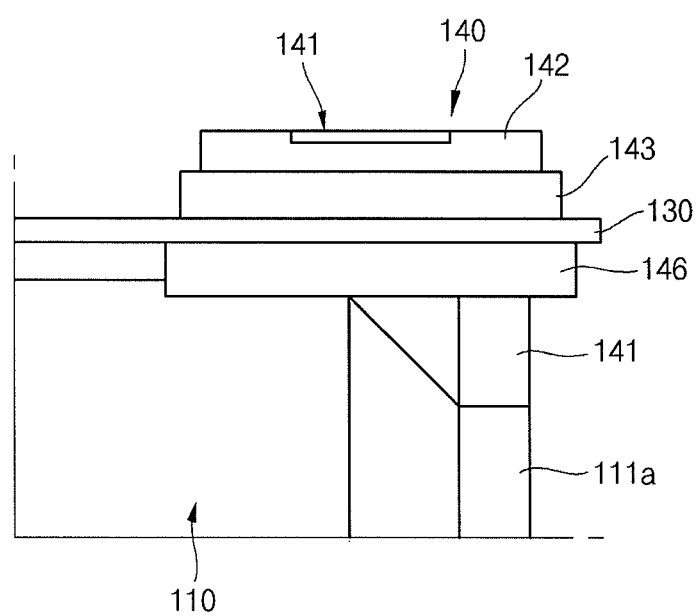
Figure 4C:
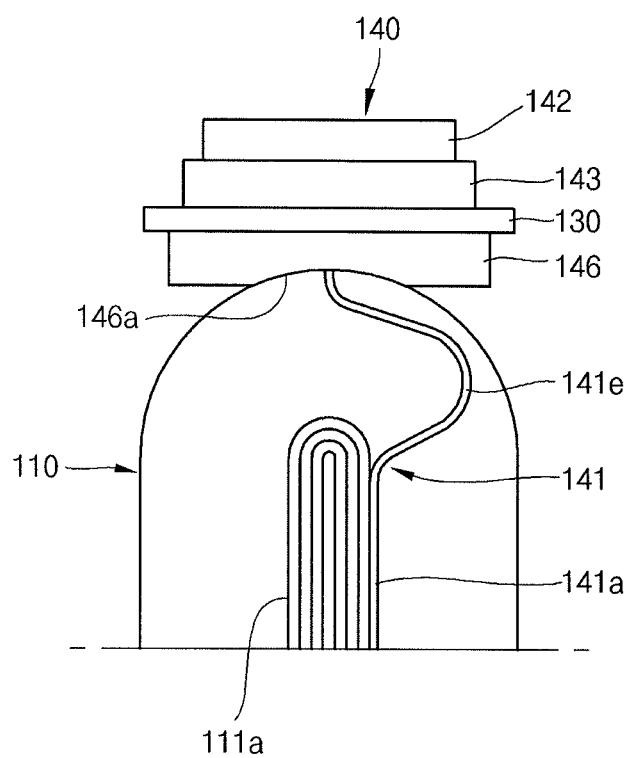

FIG. 4a illustrates a perspective view of a part of a secondary battery according to an embodiment. FIG. 4b illustrates a front view of the part of FIG. 4b. FIG. 4c illustrates a side view of the part of FIG. 4a.

Referring to FIGS. 4a through 4c, the lower insulator 146 may be disposed between the cap plate 130 and the electrode assembly 110 and may closely contact the cap plate 130 and the electrode assembly 110. Furthermore, the electrode assembly recesses 146a may be recessed upwardly in the lower surface of the lower insulator 146. Thus, the lower insulator 146 may closely contact the upper round or rounded edge of the electrode assembly 110. Accordingly, vertical shaking of the secondary battery 100 (due to external shock) may be reduced or prevented, thereby protecting the upper round of the electrode assembly 110.

Referring to FIG. 4c, the flexible collecting tab 141 may include a third bent portion 141e. The third bent portion 141e may be disposed between the first and second regions 141a and 141b. For example, the upper portion of the first region 141a (welded to the first electrode non-coating portion 111a) may be bent with a curvature, thereby forming the third bent portion 141e in a region corresponding to the lower portion of the lower insulator 146.

The forming of the third bent portion 141e may be caused by the order of a terminal assembling process. For example, the first region 141a of the flexible collecting tab 141 may be welded to the first electrode non-coating portion 111a of the electrode assembly 110. Then, the electrode assembly 110 may be accommodated in the case 120. At this point, the cap plate 130 may be spaced apart from the case 120; and the flexible collecting tab 141 may be sufficiently long to facilitate the coupling of the flexible collecting tab 141 with the terminal plate 142. Then, the second region 141b of the flexible collecting tab 141 may pass through the terminal plate 142 and may be welded thereto. Then, the cap plate 130 may be welded to the case 120. At this point, the upper portion of the first region 141a of the flexible collecting tab 141 may be bent with a certain curvature. This bending of the upper portion of the first region 141a may naturally cause the forming of the third bent portion 141e.

Figure 5:
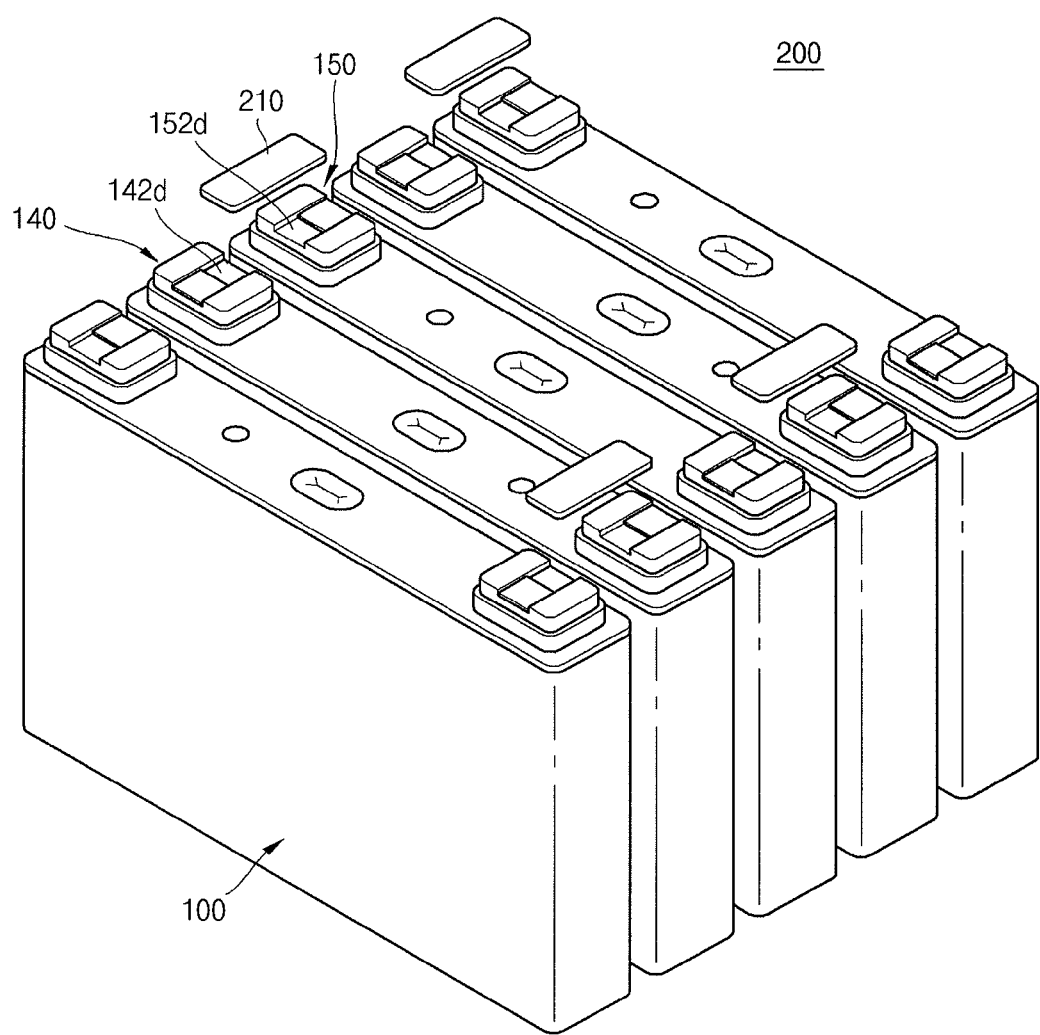
FIG. 5 illustrates a perspective view of a battery pack including secondary batteries according to an embodiment.

FIG. 5 illustrates a perspective view of a battery pack including secondary batteries according to an embodiment.

Referring to FIG. 5, the secondary batteries 100 may be horizontally arrayed to constitute a battery pack 200. Bus bars 210 may be used to connect the secondary batteries 100, e.g., in series. For example, a front end of the bus bar 210 may be placed in the bar receiving recess 142d of the terminal plate 142 of one of the secondary batteries 100 and may be welded thereto. A rear end of the bus bar 210 may be placed in a bar receiving recess 152d of the terminal plate 152 of another one of the secondary batteries 100 and may be welded thereto. The terminal plates 142 and 152 may include the bar receiving recesses 142d and 152d. Thus, the placing and welding of the bus bar 210 may be facilitated. In an implementation, the bar receiving recesses 142d and 152d may be omitted. In this case, the bus bar may be welded directly to a surface of a terminal plate.

By way of summation and review, secondary batteries may be manufactured in various shapes, e.g., a cylindrical shape and a prismatic shape. A secondary battery may be constructed as follows: electrolyte and an electrode assembly (formed by disposing an insulating separator between positive and negative electrode plates) may be placed in a case; and a cap plate may be coupled with the case. The electrode assembly may be connected to positive and negative terminals, which are exposed or protrude to the exterior of the secondary battery through the cap plate.

The embodiments provide a secondary battery that may reduce a length of a current path and electric resistance.

The embodiments also provide a secondary battery, which may increase a number of degrees of freedom of a collecting tab to thereby increase a size of an electrode assembly and may protect a non-coating portion thereof.

The embodiments also provide a secondary battery that may improve assembling efficiency of an electrode terminal and sealing of a case.

According to the embodiments, the flexible collecting tab functioning as a collecting member connecting the electrode assembly to the terminal plate may have a large number of degrees of freedom. Thus, the size of the electrode assembly accommodated in the case may be increased. Accordingly, the capacity of the secondary battery can be increased. In addition, the flexible collecting tab, which is susceptible to bending, may be used (instead of a rigid collecting tab resistant to bending). Thus, damage of the electrode assembly due to the collecting tab may be reduced.

According to the embodiments, the collecting tab may be directly electrically connected to the terminal plate. Thus, coupling of the electrode terminal may be facilitated. Furthermore, the thin collecting tab may closely contact the cap plate through the seal gasket. Thus, sealing of the secondary battery may be improved, thereby preventing leakage of the electrolyte.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
a case;
an electrode assembly inside the case;
a cap plate coupled with the case, the cap plate having an inner side facing an inside of the case and an outer side facing an outside of the case;
a flexible collecting tab electrically connected with the electrode assembly and extending continuously from the electrode assembly through the cap plate from the inner side to the outer side thereof; and
a terminal plate outside of the case and adjacent to the outer side of the cap plate, the flexible collecting tab extending continuously to and being electrically connected with the terminal plate, and an entirety of the flexible collecting tab being flexible from the electrode assembly to the terminal plate,
wherein the flexible collecting tab includes
an electrode connection portion electrically connected with a non-coating portion of the electrode assembly, and
a terminal connection portion electrically connected with the terminal plate, the terminal connection portion of the flexible collecting tab including:
a single linear member passing through a terminal plate tab through hole in the terminal plate, the terminal plate tab through hole having a rectangular cross-section in top view, and the single linear member passing through the terminal plate tab through hole having a flat sheet shape, and
a first bent portion, the first bent portion being coupled with a tab receiving recess on an upper surface of the terminal plate, and
wherein the terminal plate includes a bus bar receiving recess on the upper surface thereof, the bus bar receiving recess being disposed opposite to the tab receiving recess relative to the tab through hole, and a portion of the bus bar receiving recess being defined by the first bent portion,
wherein the terminal plate includes terminal plate protrusions on a lower surface thereof, the cap plate includes cap plate protrusion through holes therethrough, and the terminal plate protrusions pass through the cap plate protrusion through holes.

2. The secondary battery as claimed in claim 1, wherein the terminal plate and the flexible collecting tab are formed of a same material.

3. The secondary battery as claimed in claim 1, further comprising an upper insulator between the terminal plate and the cap plate, the upper insulator electrically insulating the terminal plate from the cap plate.

4. The secondary battery as claimed in claim 3, wherein the upper insulator includes an upper insulator tab through hole and an upper insulator flange, the flexible collecting tab passing through the upper insulator tab through hole, and the terminal plate being supported by the upper insulator flange.

5. The secondary battery as claimed in claim 3, wherein:
the upper insulator includes an upper insulator protrusions on a lower surface thereof, the upper insulator protrusions including upper insulator protrusion through holes therethrough,
the terminal plate protrusions pass through the upper insulator protrusion through holes, and
the upper insulator protrusions pass through the cap plate protrusion through holes.

6. The secondary battery as claimed in claim 1, further comprising:
a lower insulator under the cap plate, the lower insulator electrically insulating the electrode assembly from the cap plate, and
a seal gasket under the cap plate and coupled with the lower insulator.

7. The secondary battery as claimed in claim 6, wherein the lower insulator includes an electrode assembly recess and a lower insulator flange, the electrode assembly recess being coupled with the electrode assembly and having a shape corresponding to a rounded edge of the electrode assembly, and the lower insulator flange being coupled with the inner side of the cap plate.

8. The secondary battery as claimed in claim 6, wherein the seal gasket includes an upper extension extending upwardly from a top surface thereof, a lower extension extending downwardly from a bottom surface thereof, and a seal gasket tab through hole passing through the upper extension and the lower extension, the flexible collecting tab passing through the seal gasket tab through hole.

9. The secondary battery as claimed in claim 6, further comprising a reinforcement under the seal gasket.

10. The secondary battery as claimed in claim 9, wherein the reinforcement includes a tab groove, the flexible collecting tab passing through the tab groove.

11. The secondary battery as claimed in claim 1, further comprising:
an upper insulator between the terminal plate and the cap plate, the upper insulator electrically insulating the terminal plate from the cap plate,
a lower insulator under the cap plate, the lower insulator electrically insulating the electrode assembly from the cap plate;
a seal gasket under the cap plate and coupled with the lower insulator, and
a reinforcement under the seal gasket.

12. The secondary battery as claimed in claim 11, wherein:
the upper insulator includes upper insulator protrusions on a lower surface thereof, the upper insulator protrusions including an upper insulator protrusion through holes therethrough,
the seal gasket includes a seal gasket protrusion through holes therethrough,
the reinforcement includes a reinforcement protrusion through holes therethrough,
the terminal plate protrusions pass through the upper insulator protrusion through holes, and
the terminal plate protrusions and the upper insulator protrusions pass through the cap plate protrusion through holes, the seal gasket protrusion through holes, and the reinforcement protrusion through holes.

13. The secondary battery as claimed in claim 1, wherein the flexible collecting tab has a thickness of about 0.1 μm to about 1,000 μm.

14. The secondary battery as claimed in claim 1, wherein each of a width of the cross-section of the terminal plate tab through hole and a thickness of the single linear member is equal to a thickness of the electrode connection portion.

15. The secondary battery as claimed in claim 1, wherein the flexible collecting tab has at least a second bent portion under the cap plate, the second bent portion being in a same plane as the single linear member of the flexible collecting tab, while the first bent portion being in a different plane than the single linear member of the flexible collecting tab.

16. The secondary battery as claimed in claim 1, wherein the single linear member of the flexible collecting tab passing through the terminal plate tab through hole has a structure of a two-dimensionally, flat sheet.

17. The secondary battery as claimed in claim 1, wherein the terminal plate includes four terminal plate protrusions on a lower surface thereof, the cap plate includes four cap plate protrusion through holes therethrough, and the four terminal plate protrusions pass through the four cap plate protrusion through holes.

18. A secondary battery pack, comprising:
a plurality of secondary batteries, each secondary battery including:
a case;
an electrode assembly inside the case;
a cap plate coupled with the case, the cap plate having an inner side facing an inside of the case and an outer side facing an outside of the case;
a flexible collecting tab electrically connected with the electrode assembly and extending continuously from the electrode assembly through the cap plate from the inner side to the outer side thereof; and
a terminal including a terminal plate, wherein the terminal plate is outside of the case and adjacent to the outer side of the cap plate, and the flexible collecting tab extends continuously to and is electrically connected with the terminal plate, an entirety of the flexible collecting tab being flexible from the electrode assembly to the terminal plate,
wherein the flexible collecting tab includes
an electrode connection portion electrically connected with a non-coating portion of the electrode assembly, and
a terminal connection portion electrically connected with the terminal plate,
wherein the terminal plate includes a terminal plate tab through hole therethrough, the terminal connection portion of the flexible collecting tab passing through the terminal plate tab through hole, and
wherein the terminal connection portion of the flexible collecting tab includes a single linear member passing through the terminal plate tab through hole in the terminal plate, and a first bent portion, the first bent portion being coupled with a tab receiving recess on an upper surface of the terminal plate, wherein the terminal of one of the secondary batteries is electrically connected to the terminal of an adjacent secondary battery with a bus bar,
wherein the terminal plate tab through hole has a rectangular cross-section in top view, and the single linear member of the flexible collecting tab passing through the terminal plate tab through hole has a flat sheet shape, and
wherein the terminal plate includes a bus bar receiving recess on the upper surface thereof, the bus bar receiving recess being disposed opposite to the tab receiving recess relative to the tab through hole, and a portion of the bus bar receiving recess being defined by the first bent portion,
wherein the terminal plate includes terminal plate protrusions on a lower surface thereof, the cap plate includes cap plate protrusion through holes therethrough, and the terminal plate protrusions pass through the cap plate protrusion through holes.

19. The secondary battery pack as claimed in claim 18, wherein the bus bar connecting adjacent secondary batteries is coupled to the bus bar receiving recess of the respective secondary batteries.

* * * * *